Sept. 26, 1967  F. H. BANDERET  3,343,501
SELF-STEERING AND SELF-PROPELLED FARM VEHICLE
Filed June 29, 1965  3 Sheets-Sheet 1

INVENTOR.
FRANCIS H. BANDERET
BY
ATTORNEYS

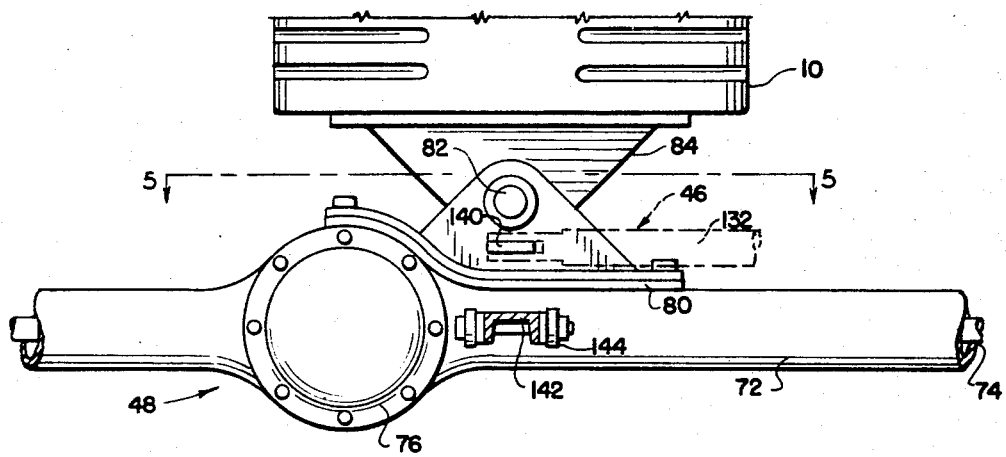
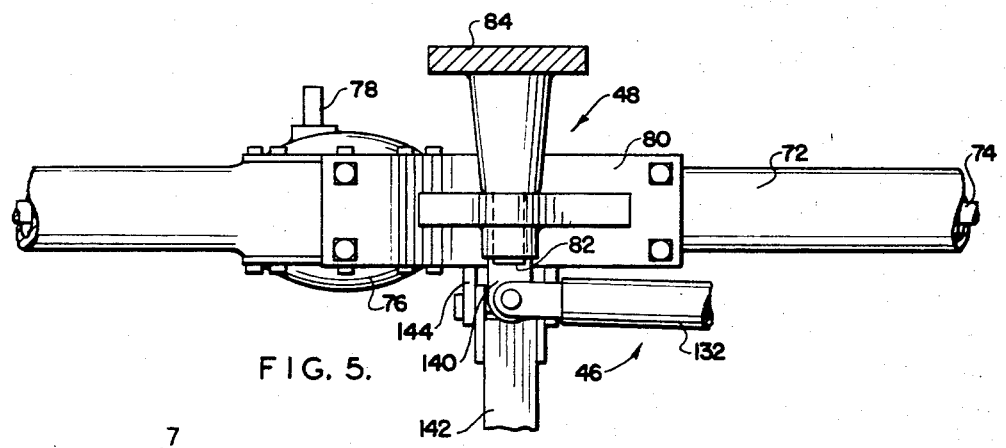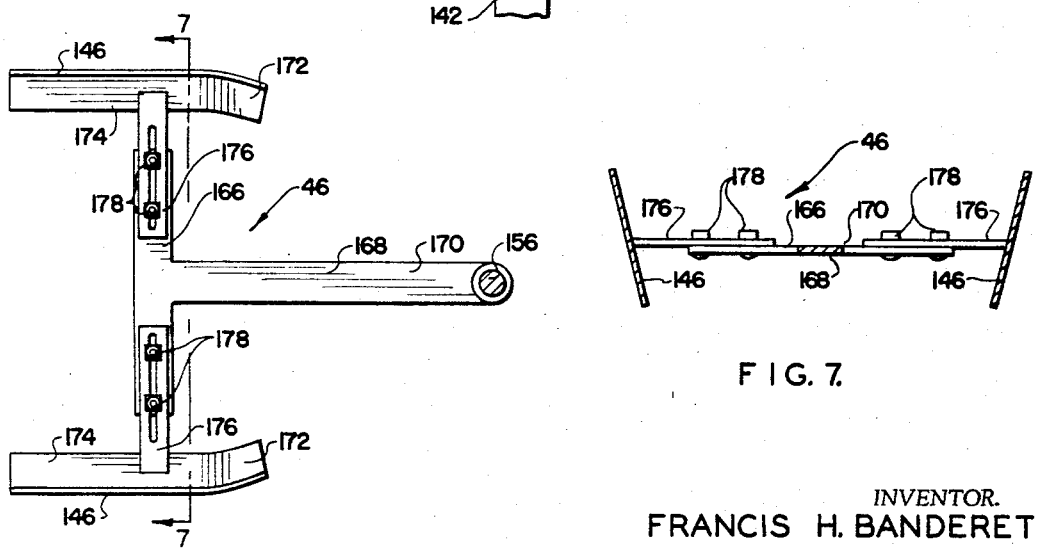

Sept. 26, 1967     F. H. BANDERET     3,343,501
SELF-STEERING AND SELF-PROPELLED FARM VEHICLE
Filed June 29, 1965     3 Sheets-Sheet 3

INVENTOR.
FRANCIS H. BANDERET
BY
ATTORNEYS

United States Patent Office 3,343,501
Patented Sept. 26, 1967

3,343,501
SELF-STEERING AND SELF-PROPELLED FARM VEHICLE
Francis H. Banderet, Rte. 2, P.O. Box 98,
Berthoud, Colo. 80513
Filed June 29, 1965, Ser. No. 467,878
17 Claims. (Cl. 104—244.1)

ABSTRACT OF THE DISCLOSURE

This invention relates to a low-speed auxiliary hydraulic front wheel drive mechanism that can be added to a conventional farm tractor for the purpose of self-propelling same along an irrigation ditch at a pre-determined speed and without interferring with the normal wheel drive. The invention also includes a pivotal guide mechanism mounted on the front end of the tractor in position to engage the sides of an irrigation ditch while the tractor wheels straddle same. This guide mechanism follows the ditch and actuates a valve that controls an hydraulic steering mechanism which keeps the tractor following the course of the ditch.

---

A self-propelled farm irrigating machine is presently being marketed which straddles an irrigation ditch and draws water therefrom which it then sprays over the planted areas alongside thereof as it moves along. This machine is designed exclusively for irrigating and it performs no other functions. The pump, spray head, tracking device, low-speed transmission, etc., are all incorporated into a single specially designed vehicle which, due to the limited demand for such devices, becomes extremely expensive to manufacture and, therefore, is priced out of the reach of most farmers. Obviously, a limited production item such as this cannot be mass produced and each one costs a great deal more than an expensive automobile, yet it is far less utilitarian.

Units of this type have other limitations which severely limit their utility even for irrigating purposes. They must, of necessity, move very slowly along a field in order to insure adequate water coverage of the planted area. On the other hand, these ditches are not continuous, but rather, are separated from one another a considerable distance, oftentimes a hundred yards or more. Because these units travel at only one speed, namely, that at which they spray the field, considerable time is wasted moving the machine from ditch to ditch. Also, during this operation, the machine must be controlled by an operator as there is no ditch for the automatic guidance system to follow, yet, the device is accomplishing no useful purpose because it is disconnected from a source of water. All in all, the foregoing results in a good deal of wasted time and effort that could well be expended in other activities.

Service has proven to be a bothersome problem with regard to these specially designed pieces of machinery, because few parts are standard and a breakdown may keep the unit out of operation for weeks until parts can be obtained from a distant manufacturer and also, perhaps, a serviceman trained to repair the equipment. The farmer, therefore, is faced with the problem of having to provide other means of irrigating his fields as a standby measure should his irrigation machine go out of commission or risk the loss of his crop during a period when the need for the device is the greatest.

Certain solutions to these problems suggest themselves. To begin with, a less costly unit would be most desirable as the device could then fall within the scope of the average farmer's buying power. Secondly, the machine should make use of as much standard equipment as possible to eliminate long delays waiting for spare parts or service in case of a breakdown and also to lower the initial cost and upkeep. Third, provisions should be made for moving the unit from ditch to ditch under its own power at speeds consistent with travel over rough terrain, say, for example, 15 to 25 m.p.h., thereby saving the farmer's valuable time for use on other productivity. Fourth, if possible, the vehicle should not be limited exclusively to use as an irrigating machine but be adaptable to more common needs.

It has now been found in accordance with the teaching of the instant invention that these and other desirable ends can be met by modifying the front end of an ordinary farm tractor so as to provide an auxiliary differential and low-speed transmission which, when operatively connected to the tractor's hydraulic pump while the main tractor transmission is in neutral, can be used to propel the vehicle at speeds commensurate with field irrigation. The main high-speed differential and tractor transmission are left intact and used to move the unit from ditch to ditch as well as in the performance of the many other jobs around the farm requiring a tractor, such as, for example, operation of the various tractor-drawn cultivating implements.

The pump, rather than being built into the unit is operated as a separate tractor-drawn implement deriving its power from the power take-off shaft of the tractor. The pump is wheel-mounted and includes as a part thereof a rotating spray head capable of throwing a stream of water 200 feet or more on opposite sides of the ditch thus irrigating a swath over 400 feet wide. Both the pump and spray head are conventional and easily obtainable on the open market. While each requires some modification to work with one another as a unitary structure, such modification is simple and can be accomplished with little expense or effort.

The wheels of the pump unit straddle the ditch and a large diameter hose equipped with a screen on one end is pulled along the bottom to provide the pump supply intake. When not in use, the pump and spray head can be disconnected from the tractor and replaced by other implements. If desired, the spray head can also be disconnected from the pump permitting the latter to be used for other pumping operations like the filling of reservoirs, stock-watering tanks, and removing ground water that has collected in low-lying areas.

The low-speed drive is connected to the steerable front wheels, whereas, the main high-speed drive is connected to the rear wheels. Hydraulic fluid under pressure is drawn from the pump and hydraulic fluid reservoir built into the body of most tractors. This fluid is fed through a flow-control valve mounted on the tractor and is then metered out to a hydraulic motor that is operatively connected to the front or auxiliary differential through a simple transmission and one or more speed reducers which gear down the hydraulic motor output so that the front wheels move only a few inches a minute. To accomplish this, the standard front end of the tractor is removed and an offset differential and steerable front wheel assembly is substituted therefor. This is the only major modification required to adapt a standard tractor for use in an irrigation assembly. Even this can be done by the farmer himself in a few hours time. It is significant that a tractor modified in this manner retains all of its ordinary capabilities.

The remaining feature of the assembly is the automatic guidance system by which the tractor follows the course of the ditch unattended. Adjustable guide shoes are mounted on the front of the tractor which are lowered into the ditch and contact the banks thereof. These shoes are connected to a hydraulic control valve that receives fluid under pressure from the tractor in the same way as the hydraulic motor. This control valve is responsive to side-to-side movements of the guide shoes and functions to operate a double-acting hydraulic servo-motor that, in turn, steers the tractor and keeps it following the ditch. This guidance unit can be raised up out of the way when the tractor is being used for other purposes.

It is, therefore, the principal object of the present invention to provide a novel and improved self-propelled field irrigation assembly that utilizes an ordinary farm tractor as the source of vehicular power when modified to include an auxiliary low-speed front-wheel drive.

A second objective of the invention herein disclosed and claimed is the provision of a device of the type aforementioned that utilizes a commercially available tractor, wheel-mounted pump, spray head, offset differential and hydraulic system components.

Another object of the invention is to provide an irrigating machine that leaves the standard tractor transmission and high-speed differential connected to the rear-drive wheels intact so that the vehicle can be used for other purposes.

Still another object is to provide an assembly of the character aforementioned in which the tractor is steered automatically so as to straddle the ditch and follow the course thereof by means of a hydraulically-operated guidance system that takes its fluid from the tractor's hydraulic fluid reservoir.

An additional objective is the provision of hydraulic controls in the guidance system by means of which the speed of tractor movement can be carefully controlled as well as the rate at which the steering assembly responds to directional information fed thereto by the guide shoes.

Further objects of the herein-described invention are to provide a self-propelled irrigating machine that is relatively inexpensive, reasonably compact, easy to service, versatile, simple to operate, efficient and readily adapted for use on a wide variety of commercially available farm tractors.

Other objects will be in part apparent and in part pointed out specifically hereinafter in connection with the description of the drawings that follows, and in which:

FIGURE 4 is a fragmentary front elevation of the offset front differential and its mounting on the tractor;

FIGURE 5 is a section taken along line 5—5 of FIGURE 4;

FIGURE 6 is a fragmentary section taken along line 6—6 of FIGURE 1 showing the details of the guide shoes; and, FIGURE 7 is a section taken along line 7—7 of FIGURE 6.

Figure 1:
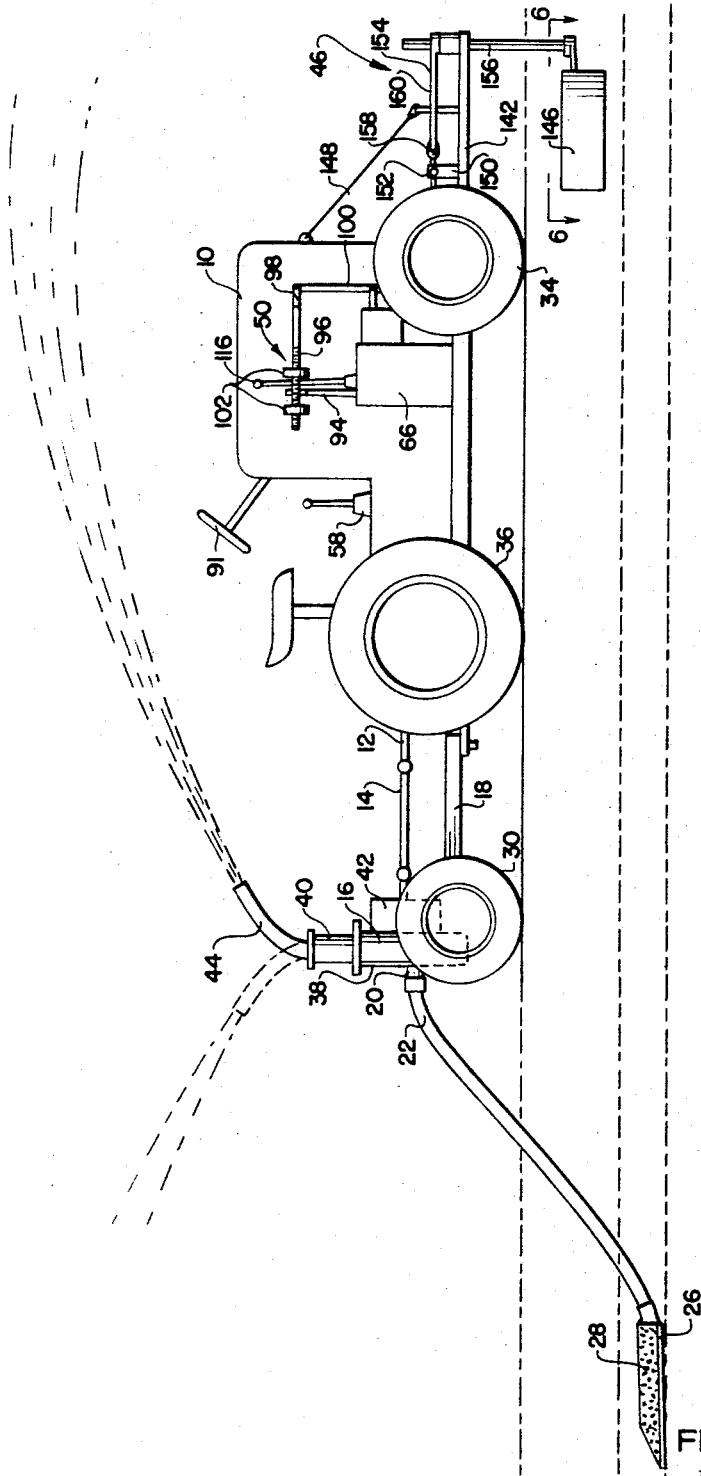
FIGURE 1 is a side elevation of the entire irrigating apparatus showing the tractor equipped with the guidance system disposed astraddle an irrigation ditch, the tractor-drawn pump and rotating spray head, the intake line, and the speed control.
Figure 2:
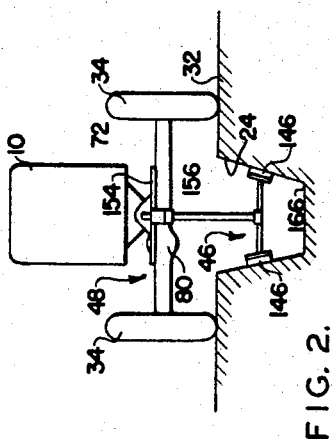
FIGURE 2 is a front elevation, largely schematic, showing the guide shoes disposed between the ditch bank and the tractor wheels astraddle thereof.

Referring now to the drawings for a detailed description of the present invention and, initially, to FIGURES 1 and 2 for this purpose, reference numeral 10 represents an ordinary farm tractor of the type equipped to include a power take-off 12 at the rear end thereof by means of which power is supplied through jointed shaft 14 to wheel-mounted pump 16. Pump 16 is attached in towed position behind the tractor by conventional drawbar 18. Intake 20 of the pump is connected to a flexible intake hose 22 that drops down into the bottom of irrigation ditch 24 through which water is flowing. The free end of the intake hose has a skid 26 attached thereto that slides along the ditch bottom and a screen 28 that prevents the entry of mud and debris that might otherwise clog the pump.

Pump 16 is of the commercially available type having wheels 30 spaced apart a sufficient distance to straddle the ditch and run along the banks 32 thereof as do the front and rear wheels 34 and 36 of the tractor.

Intake 20 communicates the interior of impeller housing 38 which contains an impeller (not shown) connected directly to jointed input shaft 14. Ordinarily, the outlet or discharge 40 of the pump is arranged to discharge the water out the side of the housing as this is the attitude in which such a unit is most often employed. In this instance, however, the discharge 40 is rotated approximately 90° until it points vertically upward as shown, such a procedure usually involving little more than loosening a few bolts and turning the impeller housing relative to its wheeled carriage 42.

Mounted atop the pump discharge is a rotating spray head 44 which, likewise, is readily available on the open market. No attempt has been made to show the details of this spray head, it being sufficient to note that such units swing around under the influence of the stream of water passing therethrough and are capable under proper pumping conditions of throwing a stream of water over 200 feet. These heads include provisions for adjusting the arc through which the nozzle swings so as to prevent water being sprayed directly ahead where it would fall on the tractor.

Now, admittedly, there would be no invention involved in towing a wheel-mounted pump behind a farm tractor and drawing water from an irrigation ditch while spraying it out onto the cultivated areas alongside thereof. On the other hand, such an assembly would be completely impractical for irrigating purposes for several reasons. To begin with, no farm tractor is geared down slow enough to provide adequate water coverage as it moved along the ditch. Secondly, such a unit would require an operator to be present at all times to guide the tractor and keep it from running into the ditch. This would be an extremely time-consuming and boring operation, to say the least. Accordingly, to make the above-described assembly practical, means must be provided for slowing down the speed of the tractor to a few inches a minute and also a guidance system which will eliminate the need for an operator. Preferably, these innovations should not interfere or otherwise limit the use of the tractor for other than irrigating purposes. It is these features in combination with the tractor pump and spray head that constitute the present invention and which will now be described in detail.

Figure 3:
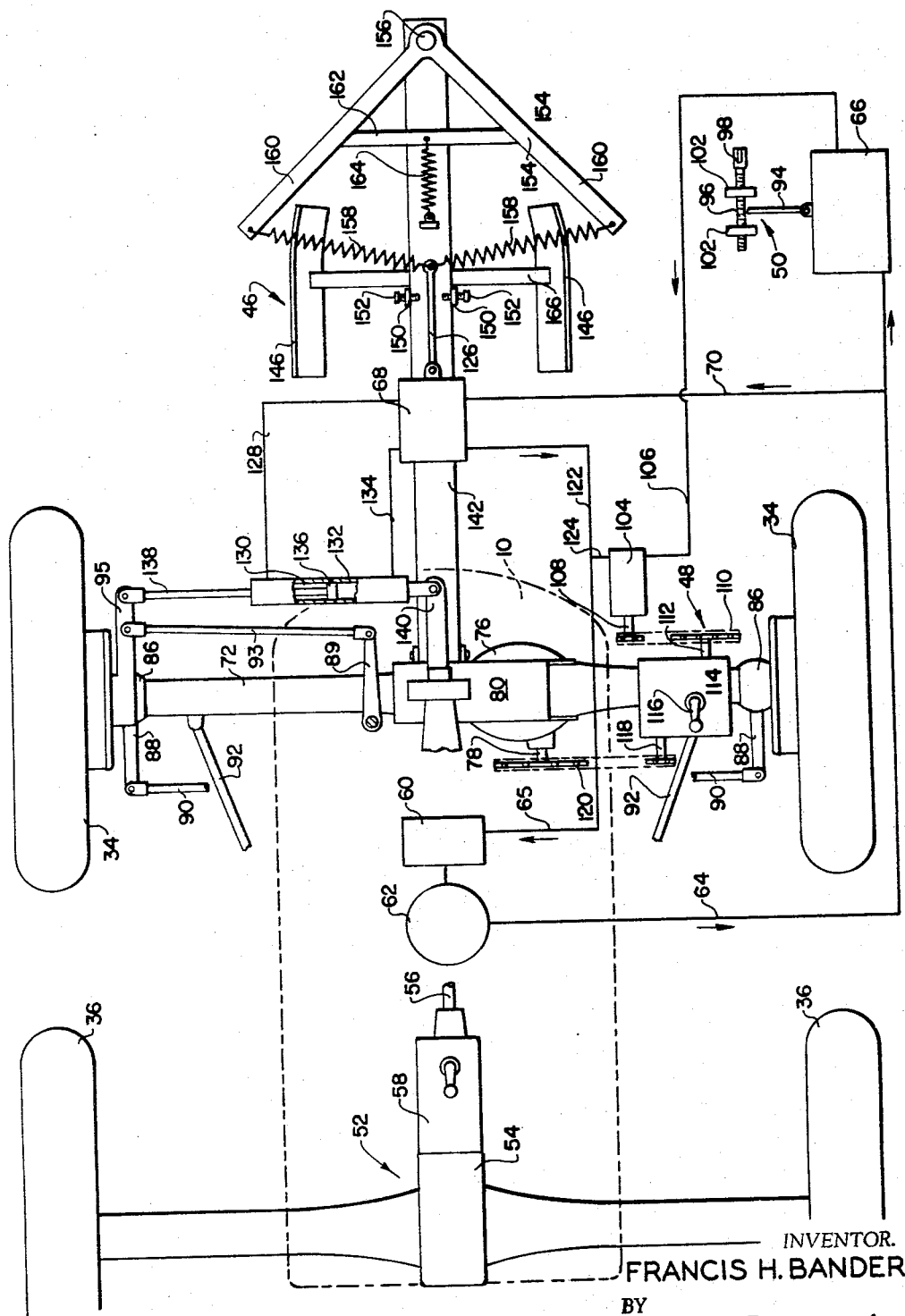
FIGURE 3 is a top plan view, again somewhat schematic, showing the conventional rear-wheel tractor drive, the auxiliary front-wheel low-speed drive, and the hydraulic steering and automatic guidance systems together with the controls therefor.

Referring next to FIGURES 1, 2, and 3, the guidance system has been referred to broadly by reference numeral 46, the low-speed front-wheel drive by reference numeral 48, and the speed control by numeral 50. The high-speed rear-wheel drive assembly 52 of the tractor is left intact and includes a high-speed differential 54 transmitting power from drive shaft 56 to the rear wheels 36 through multi-speed transmission 58. The latter rear-wheel drive is used for all normal applications for the tractor, including that of moving the irrigating apparatus, of which the tractor forms an important part, from ditch to ditch. While the actual irrigating operation is being carried out, however, transmission 58 is shifted into neutral to remove all drive power to the rear wheels.

Both the guidance or steering system 46 and the low-speed drive 48 are hydraulically powered from the tractor's built-in hydraulic system which has been shown schematically in FIGURE 3 and includes a reservoir 60 and a pump 62. Many of the large farm tractors include such hydraulic systems as an integral part thereof and these systems also usually provide auxiliary fluid feed and return connections for use in connecting hydraulically-operated accessories thereto in addition to the built-in hydraulic units such as, for example, power brakes and power steering. In FIGURE 3 hydraulic feed line 64 has been connected to the outlet of the tractor's hydraulic pump and return line 65 to the reservoir. Hydraulic fluid under pressure is fed through line 64 to one-way flow control valve 66 of the speed control system 50 and also to two-way valve 68 of the guidance system by means of branched feed line 70. Now, before proceeding with a detailed description of the low-speed drive and guidance systems, it would be well to first examine briefly the steerable front wheel assembly that is substituted for the factory assembly and which has been shown most clearly in FIGURES 4 and 5 to which reference will now be made. On many tractors, the front wheels are closer together than the rear wheels and would not, for this reason, be able to straddle an irrigation ditch. In addition, few, if any, tractors have front-wheel drives. It thus becomes necessary to remove from the tractor the factory-built steerable front wheel and axle assembly and substitute therefor a steerable front wheel drive unit having a wheel base wide enough to straddle the ditch. Such a unit has been shown in FIGURES 4 and 5.

In the particular form shown, it comprises an axle housing 72 containing an axle 74 journalled for rotation therein. Offset to one side of the center of the axle housing is the differential housing 76 that contains the differential gearing (not shown) which drives the axles in response to power supplied to input stub shaft 78 (FIGURE 5). A special mounting bracket 80 is bolted to the axle housing at the center thereof and this bracket, in turn, connects onto pivot pin 82 that is fastened to the underside of the main tractor frame 84. The pivotal connection thus produced permits the front steerable wheel assembly to tilt about a horizontal axis extending in the direction of tractor movement.

Again with reference to FIGURE 3, it will be seen that one of the standard steerable drive wheel connections has been schematically represented in which ball-and-socket joints 86 fasten the brake drum to the axle housing for pivotal movement about vertically-disposed steering axes. The universal driving connection between the wheels and axles is made inside the pivotal connection just described in the conventional manner and, for this reason, has not been shown. Radius rods 88 connect the wheels to steering links 90 and the latter connect to the tractor's steering system in the same way as the factory-installed front end assembly. Steering knuckle 89 is connected to the steering wheel 91 (FIGURE 1) and also to steering link 93 that fastens pivotally to the main radius rod 95 shown attached to the left front wheel. Braces 92 connect the axle housing to the tractor frame.

The above-described front wheel steerable drive assembly is intended as being merely illustrative of one of many such drives that can be substituted for the factory-built steerable wheel assembly that the tractor comes equipped with originally. In sofar as the elements previously set forth are concerned, they constitute nothing new and various suitable steerable front-wheel drive assemblies can be used without detracting from the merit of the invention herein disclosed or its utility. Ordinarily, of course, the tractor drive shaft 56 would be connected in driving relation to input shaft 78. Here, however, the front wheel drive is entirely independent of the tractor's mechanical drive; instead, the power therefor is derived from the tractor's hydraulic system. In fact, the only operative mechanical connection between the steerable front wheel drive assembly and the tractor is through the steering linkage so that the opertaor can steer the front wheels.

The hydraulic front wheel drive is revealed most clearly in FIGURES 1 and 3 to which reference will now be made. Hydraulic fluid under pressure flows from pump 62 into feed line 64 where it enters the inlet of one-way flow-control valve 66. This valve includes an operator 94 which rocks to and fro to control the flow of fluid therethrough. The position of this operator and, therefore, the speed of the vehicle is set by means of a screw 96 having a clevis 98 on one end that is used to pivotally mount the screw to a suitable supporting structure 100 carried by the tractor. Mounted on this screw are a pair of large nuts 102 that engage the operator 94 on opposite sides and can be adjusted along said screw to vary the degree to which the operator is held open. Obviously, other adjustable mechanisms could be attached to the valve or built into same for metering the flow of fluid therethrough and the particular apparatus illustrated is intended as being merely illustrative of one such mechanism that would suffice for this purpose.

Now, the fluid metered from the outlet of valve 66 is fed into hydraulic motor 104 through line 106. The output shaft 108 of this motor is connected by a chain-and-sprocket reducer drive 110 to the input shaft 112 of the transmission 114. This transmission can be shifted into neutral by means of shift lever 116 thereby rendering its output shaft 118 inoperative. This, of course, is done whenever the main transmission 58 is engaged. Output shaft 118 is, in turn, connected to the input shaft 78 of the front differential by a second chain-and-sprocket reducer 120.

The net effect of the flow control valve 66, reducers 110 and 120, and transmission 114 is to gear down hydraulic motor 104 to the point where it will turn the front drive wheels only a few inches a minute. Here again there are many mechanisms other than those illustrated which will provide the necessary function of gearing down the rotational drive power to the front wheels and providing means for disengaging same whenever the main transmission is engaged or being used to power the rear wheels at normal speeds. For instance, all of the required speed reductions together with the disengagement function could easily be incorporated into the transmission. Also, by providing the transmission with a plurality of speed ratios, the control provided by valve 66 would be unnecessary and it could be eliminated. In other words, hydraulic motor 104 could run at a constant speed fed directly from pump 62 and use a multi-ratio transmission to provide the speed control.

There are, however, certain practical advantages to the system as illustrated, the main ones relating to the simplicity with which it can be serviced and repaired. Sprockets and sprocket chains, for example, are quite readily available and easy to remove and replace by the farmer himself. The same is true to some extent of the one-way valve, hydraulic motor, and simple transmission; whereas, if these elements were combined into a more complex unitary assembly, they would be harder to obtain in a small community and also require factory service in many instances.

Finally, reference will be made to all of the figures of the drawing, each of which reveal some parts of the guidance system, for a detailed description of the latter. Fluid under pressure from branched conduit 70 enters two-way hydraulic control valve 68 which has a return line 122 connected to the reservoir 60. The outlet of hydraulic motor 104 is also connected into this return line by means of conduit 124.

Valve 68 is controlled by an operator 126 which, in the neutral position shown in FIGURE 3, shunts the fluid through a by-pass so that it returns directly to the reservoir. Movement of valve operator 126 to the right of its neutral position as viewed in FIGURE 3 will connect line 128 to receive fluid from line 70 and deliver it into the head-end 130 of double-acting hydraulic servo-motor 132 while line 134 receives fluid exhausted from the tail-end thereof and returns it to return line 122. As the piston 136 of the servo-motor retracts, the piston rod 138 thereof connected to the main radius rod 95 of the tractor's steering system will cause the wheels to turn to the right. Conversely, shifting valve operator 126 to the left of its mid- or neutral position will reverse the direction of fluid flow through the servo-motor by connecting line 70 with line 134 and line 128 with return line 122 so that piston 136 will extend and turn the front steerable wheels to the left.

The rear end of cylinder 132 is pivotally attached to ear 140 projecting from bracket 80 that mounts the front drive wheel assembly onto the tractor. Servo-motor 132 is connected to the same radius rod 95 and steering link 93 of the manual steering system; however, the servo-motor overrides the manual steering system whenever the unit is being used for irrigation. To return the unit to manual control, it is only necessary to disconnect the piston rod 138 of the servo-motor from radius rod 95.

On tractors already equipped with power-steering, a servo-motor similar to motor 132 will already be provided on the vehicle, therefore, lines 128 and 134 would be connected directly to such a power-steering servo-motor with suitable valves to shift the control thereof from the steering wheel to valve 68 and vice versa.

Valve 68 is mounted on a forwardly-projecting tongue 142 that is pivotally attached to a bracket 144 that is welded or otherwise attached to axle housing 72. The pivotal connection for the tongue allows it to be raised into an operative position where the guide shoes 146 carried thereby are elevated above ground level and also to be lowered into the operative position of FIGURES 1 and 2 where these shoes engage the ditch banks 24. An adjustable lanyard 148 (FIGURE 1) holds the tongue and shoes in adjusted position.

Fastened to the tongue in position alongside the valve operator 126 are a pair of upstanding ears 150 into which are threaded a pair of adjustable stops 152. These stops engage the valve operator and limit the extent to which it opens the control valve 68. In so doing, the speed at which the wheels steer right and left in response to movement of the guide shoes around a curve in the ditch can be carefully controlled. In other words, guide shoes 146 are connected to a steering yoke 154 by means of a common pivot pin 156, such that the yoke responds to all movements of the guide shoes as they shift from side to side in conformity with changes in the direction of the ditch. The yoke is also connected to the valve operator 86 by tension springs 158 that swing the operator from side to side and control servo-motor 132. It is essential that the movement of the front wheels and guide shoes be carefully coordinated so that the tractor stays up on the ditch banks at all times. Obviously, as soon as the shoes move to one side, the wheels will turn to compensate for this shift and immediately return the shoes to their centered position, whereupon, the wheels will also straighten out. If, however, the wheels respond too quickly because the servo-motor is being fed too much fluid, the vehicle will tend to yaw back and forth much of the time. This undesirable situation is easily corrected by adjusting stops 152 so that the valve will not open too far and the servo controlled thereby will act slowly to correct for a shift in the shoes. It is, likewise, obvious that the wheels must respond quickly enough to steer the tractor around a bend in the ditch or the entire guidance system is valueless. In actual operation, there is a good deal of latitude here, and the only control required is to prevent the valve from opening so far that the wheels turn very quickly. Most changes in direction are so slight and gradual that the operator is not shifted far enough to hit the stops.

The yoke 154 has rearwardly-divergent arms 160 that terminate on opposite sides of the valve operator 126. Tension springs 158 permit the yoke to swing from side to side through an arc longer than the valve operator can swing by reason of stops 152. If on the other hand rigid links connected the yoke to the valve operator, the limit of guide shoe excursion would be determined by stops 152 and this, of course, would be unsatisfactory.

As illustrated, yoke 154 has a crossbar 162 extending between the legs 160 and a tension spring 164 connected between the mid-point of the crossbar and the tongue. Spring 164 and the cross-bar cooperate to return the yoke and associated guide shoes into centered position.

The guide shoes 146 are mounted for adjustable movement from side to side so as to change the spacing therebetween on the ends of the crossbar portion 166 of a T-shape support 168. The stem-portion 170 of support 168 extends forwardly from the crossbar portion 166 and has the free end thereof fastened to the lower end of pivot pin 156.

The shoes 146 themselves are shaped like skids or skis having an inturned front end 172 ahead of rearwardly-extending base portion 174. The base portions parallel the sides of the ditch and are preferably inclined upwardly and outwardly sideways to conform with the sloping ditch walls as shown in FIGURE 2. The shoes are connected to the crossbar portion 166 of the T-shaped support by a slotted arm 176 that receives fasteners 178 carried by said arms.

Having thus described the several useful and novel features of the improved self-propelled irrigating machine of the present invention, it will be apparent that the many worthwhile objectives for which it was developed have been achieved. Although but a single specific embodiment of the invention has been disclosed, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. In a farm tractor of the type having an internal combustion engine, a pair of rear drive wheels powered by the engine, main transmission means operative upon engagement to propel the vehicle at moderate highway speeds and also to disengage the rear wheels from the engine, a hydraulic system including a pump and reservoir operatively connected to the engine, a pair of steerable front wheels, and a manual steering mechanism operatively connected to the front wheels, the improvements which comprise: an automatic guidance system mounted in front of the tractor for movement therewith adapted to follow the course of an irrigation ditch straddled by the wheels, said guidance system including a pair of guide shoes positioned within the ditch in engagement with the walls thereof and mounted for pivotal movement about a substantially vertical axis, a double-acting hydraulic servo-motor connected to the steering mechanism and operative to steer the front wheels, a two-way hydraulic control valve connected to receive fluid from the hydraulic system and deliver same to the servo-motor, and actuating means responsive to pivotal movement of the guide shoes operative to shift the control valve and energize the servo-motor so as to turn the front wheels in the direction required to maintain same astraddle the ditch; and, a low-speed hydraulically-operated front wheel drive mechanism adapted to propel the vehicle along the ditch while the rear-drive wheels are disengaged from the engine, said mechanism including a front differential connected to the steerable wheels in driving relation to the latter, a hydraulic motor connected to receive fluid from the hydraulic system and produce a second source of rotational drive power, speed reduction means operatively interconnecting the hydraulic motor and front differential adapted to reduce the speed of the latter to that which is consistent with spray irrigation, and secondary transmission means connected in the drive train to the front wheels, said transmission having an engaged position operative to supply drive power to the front wheels when the rear wheels are disengaged by the main transmission and a neutral position disengaging the front wheels to permit normal operation of the rear-wheel drive.

2. The improved tractor as set forth in claim 1 in which: the guide shoes are laterally adjustable to change the spacing therebetween so as to accommodate ditches of varying widths.

3. The improved tractor as set forth in claim 1 in which: the front-wheel drive mechanism includes a one-way control valve connected into the hydraulic system upstream of the hydraulic motor, said valve being operative to control the flow of fluid to the motor thus regulating the speed of the drive train.

4. The improved tractor as set forth in claim 3 in which: the one-way valve includes a valve operator having a neutral position operative to by-pass the fluid past the hydraulic motor back to the hydraulic system reservoir and an operative position wherein the quantity of fluid delivered to the hydraulic motor is controlled; and in which, flow control means are provided in adjustable association with the one-way valve operator, said adjustment means being operative in selected adjusted positions to set the valve operator and control the speed of the vehicle.

5. The improved tractor as set forth in claim 1 in which: the speed reduction means comprises a chain and sprocket drive.

6. The improved tractor as set forth in claim 1 in which: the guidance system includes adjustable stop means operatively associated with the two-way hydraulic control valve and adapted to limit the maximum amount of fluid delivered to the double-acting hydraulic servo-motor, and in which the actuating means includes yieldable elements connecting same to the two-way valve, said yieldable elements functioning to shift said control valve in response to pivotal movements of the guide shoes within the limits established by the stop means, and said yieldable elements also functioning to permit continued pivotal movement of the guide shoes past the limit of the stops without further opening said control valve so that the servo-motor controlled thereby will respond gradually to a change in direction indicated by the guide shoes.

7. The improved tractor as set forth in claim 6 in which: the yieldable elements comprise tension springs.

8. The improved tractor as set forth in claim 1 in which: the double-acting hydraulic servo-motor comprises a cylinder connected to the two-way valve to receive and exhaust fluid from both ends thereof and a piston connected to the steering mechanism; the two-way valve has a valve operator with a neutral position wherein the fluid by-passes the servo-motor and returns directly to the hydraulic system reservoir and two operative positions, the first of said operative positions circulating the fluid in a direction to retract the piston and the second operative position circulating the fluid in the opposite direction to extend same; and in which the actuating means includes a pair of rearwardly divergent arms connected at their apex to the guide shoe pivot, said arms terminating on opposite sides of the valve operator, a pair of tension springs connecting the rear extremity of each arm to the valve operator, and a third tension spring connecting the arms to a fixed abutment at a position selected to normally bias the guide shoes into centered position.

9. The improved tractor as set forth in claim 1 in which: means are provided for disconnecting the double-acting hydraulic servo-motor from the steering mechanism so as to return the vehicle to manual control by means of the manual steering apparatus.

10. The improved tractor as set forth in claim 1 in which: the guide shoes are vertically adjustable to accommodate ditches of varying depths.

11. A hydraulically-operated front wheel drive for use on farm tractors of the type having an internal combustion engine, a pair of rear drive wheels powered by the engine, a main transmission operative in engaged position to propel the vehicle at moderate highway speeds and in neutral position to disengage the rear wheels from the engine, a pair of steerable front wheels, and a hydraulic system including a pump and reservoir operated by the engine, which comprises: a front differential connected in driving relation to the front steerable wheels, a hydraulic motor connected to receive fluid from the hydraulic system and produce a secondary source of rotational drive power, a speed reducer drive train operative by interconnecting the hydraulic motor and front differential in driving relation, and a second transmission connected into the drive train, said transmission having an engaged position operative to transmit rotational drive power from the hydraulic motor to the front wheels and a neutral position operative to disengage the front wheel drive thus returning control of the vehicle to the rear wheel drive.

12. The hydraulically-operated front wheel drive as set forth in claim 11 which includes: a one-way control valve connected into the hydraulic system upstream of the hydraulic motor, said valve being operative to control the flow of fluid to the motor thus regulating the speed of the drive train.

13. The hydraulically-operated front wheel drive as set forth in claim 12 in which: the one-way valve includes a valve operator having a neutral position operative to by-pass the fluid past the hydraulic motor back to the hydraulic system reservoir and an operative position wherein the quantity of fluid delivered to the hydraulic motor is controlled; and in which, flow control means are provided in adjustable association with the one-way valve operator, said adjustment means being operative in selected adjusted positions to set the valve operator and control the speed of the vehicle.

14. The hydraulically-operated guidance system for farm tractors of the type having an internal combustion engine, a pair of steerable front wheels, a manual steering mechanism operatively connected to the steerable wheels, and a hydraulic system including a pump and reservoir operatively connected to the tractor engine, which comprises: a pair of guide shoes mounted in front of the steerable wheels in position to be lowered into an irrigation ditch straddled by the latter, said shoes being carried for pivotal movement about a substantially vertical axis and spaced apart a distance adapted to place same in free sliding contact with the ditch walls, a double-acting hydraulic servo-motor connected to the steering mechanism and operative to steer the front wheels, a two-way hydraulic control valve connected to receive fluid from the hydraulic system and deliver same to the servo-motor, and actuating means responsive to pivotal movement of the guide shoes operative to shift the control valve and energize the servo-motor so as to turn the front wheels in the direction required to maintain same astraddle the ditch, said actuating means including a pair of rearwardly divergent arms connected at their apex to the guide shoe pivot, said arms terminating on opposite sides of the valve operator, a pair of tension springs connecting the rear extremity of each arm to the valve operator, and a third tension spring connecting the arms to a fixed abutment at a position selected to normally bias the guide shoes into centered position.

15. The hydraulically-operated guidance system as set forth in claim 14 which includes: adjustable stop means operatively associated with the two-way hydraulic control valve and adapted to limit the maximum amount of fluid delivered to the double-acting hydraulic servo-motor, and in which the actuating means includes yieldable elements connecting same to the two-way valve, said yieldable elements functioning to shift said control valve in response to pivotal movements of the guide shoes within the limits established by the stop means, and said yieldable elements also functioning to permit continued pivotal movement of the guide shoes past the limit of the stops without further opening said control valve so that the servo-motor controlled thereby will respond gradually to a change in direction indicated by the guide shoes.

16. The hydraulically-operated guidance system as set forth in claim 15 in which: the yieldable elements comprise tension springs.

17. The hydraulically-operated guidance system as set forth in claim 14 in which: the double-acting hydraulic servo-motor comprises a cylinder connected to the two-way valve to receive and exhaust fluid from both ends thereof and a piston connected to the steering mechanism; and in which the two-way valve has a valve operator with a neutral position wherein the fluid by-passes the servo-motor and returns directly to the hydraulic system reservoir and two operative positions, the first of said operative positions circulating the fluid in a direction to retract the piston and the second operative position circulating the fluid in the opposite direction to extend same.

References Cited

UNITED STATES PATENTS 1,868,360    7/1932    Knight.
3,181,478    5/1965    Smeal _____ 280—87.2 X A. HARRY LEVY, *Primary Examiner.*